Dec. 23, 1930.  H. F. SMITH  1,785,820
DOMESTIC GAS GENERATING SYSTEM
Filed July 30, 1921  3 Sheets-Sheet 1
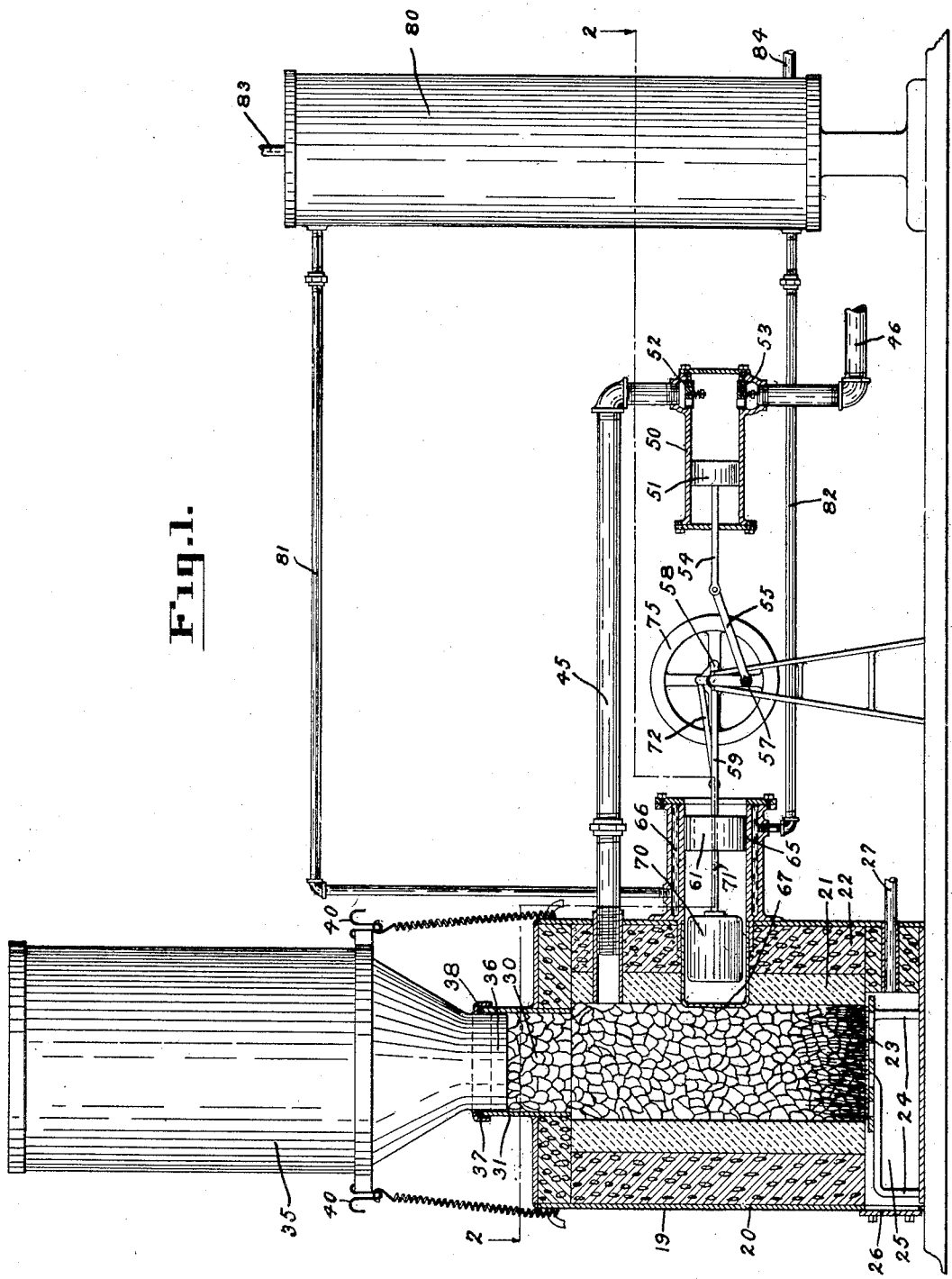

Dec. 23, 1930.　　　　H. F. SMITH　　　1,785,820
DOMESTIC GAS GENERATING SYSTEM
Filed July 30, 1921　　3 Sheets-Sheet 2
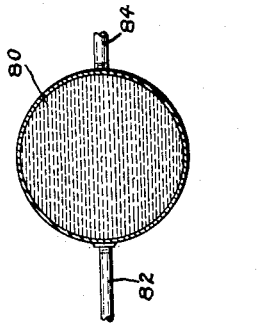
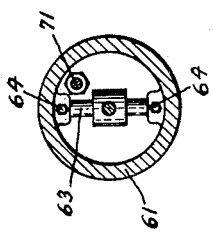
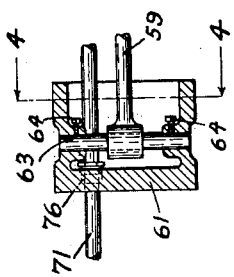
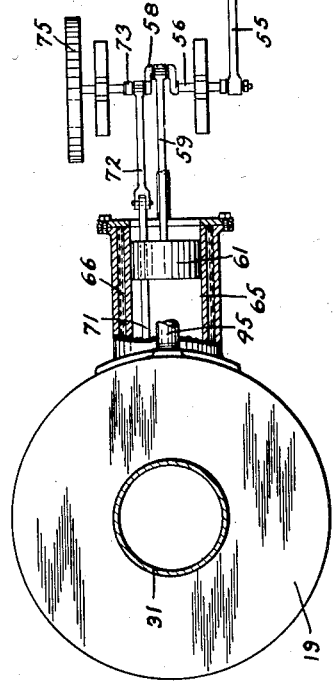
Witnesses
Charles E. Greene
Herman F. Duen
Inventor
Harry F. Smith
By
Attorney

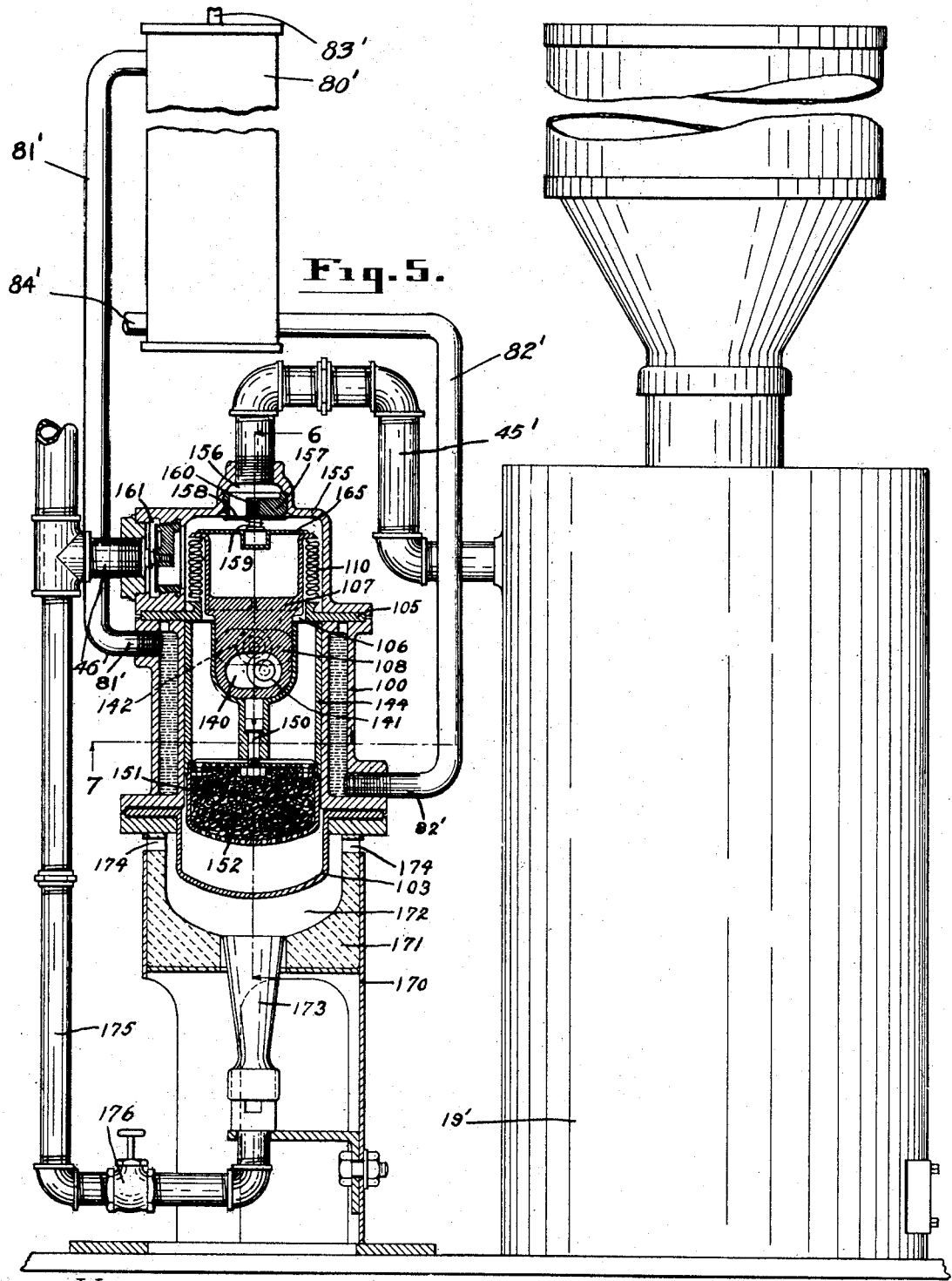

Patented Dec. 23, 1930

1,785,820

UNITED STATES PATENT OFFICE

HARRY F. SMITH, OF DAYTON, OHIO, ASSIGNOR TO THE GAS RESEARCH COMPANY, OF DAYTON, OHIO, A CORPORATION OF OHIO

DOMESTIC GAS-GENERATING SYSTEM

Application filed July 30, 1921. Serial No. 488,674.

This invention relates to gas generation and more particularly to the generation of gas from carbonaceous fuel, such as coal.

In producers, such as have been heretofore widely used, it has been the general practice, in connection with larger size producers, to use a steam engine for driving the exhauster, or pump, which furnishes the blast, and to use an electric motor for driving the exhauster, in smaller size producers. The producers heretofore in general use have run in size in excess of twenty-five horsepower, most of them running several horsepower, and some of them several thousands of horsepower. The efficiency of the large size steam engines and electric motors required for operating these producers is good, so that the proportionate cost for power for operating the producer is small. The producer shown in this application, however, is comparatively quite small, producers of this character being particularly adapted for furnishing gas for domestic or farm use, and in size range down to as low as one horsepower. For operating the exhauster or blower, forming a part of such a producer, a steam engine of any of the types now manufactured is out of the question, from a practical point of view. Fractional horsepower electric motors will function satisfactorily, so far as operation is concerned; but with such motors the proportionate cost of the power for operating the producer becomes excessive, so much so as to render the cost of operation of a small size plant of this character practically prohibitive. It is a well known fact that the efficiency of fractional horsepower electric motors decreases very rapidly as the size of the motor decreases. That is, a ⅛ horsepower motor develops half the power of a ¼ horsepower motor, but it takes considerably more than half as much current to develop that power. Therefore the cost, per horsepower developed, of operating a fractional horsepower motor increases very rapidly as the size of the motor decreases.

One of the principal objects of this invention is to provide a gas generating apparatus, particularly of small size, comprising a power unit, for operating the blasting means, the cost of operation of which power unit is sufficiently low to permit of general utilization of this small size plant.

Another object of the invention is to provide a method of generating and utilizing gas, and apparatus for carrying that method into effect, including a hot water supply system, in which the heat energy resulting during the gas making reactions is utilized for furnishing the power for carrying on the further generation of the gas, and in addition the heat rejected by the power unit serves to heat the water in the hot water supply system.

Another object of the invention is to provide a closed cycle engine and a hot water supply system in which the heat energy rejected during operation of the engine heats the water within the hot water supply system.

Another object of the invention is to provide gas generating apparatus in which a hot air engine furnishes the power for carrying on the gas making reactions.

Other objects and advantages of the invention will be apparent from the description thereof set out below, when taken in connection with the accompanying drawing.

While this invention is generally applicable to gas generation, for purposes of description, and as illustrating a preferred embodiment thereof, it is shown in connection with a suction operated gas producer constructed to gasify coal, coke, charcoal or analogous fuels. Of course, however, it is not limited to this particular adaptation.

In the drawing, in which like characters of reference designate like parts throughout the several views thereof, Fig. 1 is a partly diagrammatic view of a form of apparatus for carrying out the method of gas generation, certain parts being shown in vertical section to more clearly disclose the invention;

Fig. 2 is a sectional view along the line 2—2 of Fig. 1;

Fig. 3 is a vertical sectional view through the piston of the engine in Figs. 1 and 2, to more clearly show certain details of construction thereof, the view being substantially along the line 2—2 of Fig. 1;

Fig. 4 is a sectional view of the piston along the line 4—4 of Fig. 3; and

Fig. 5 is a vertical view analogous to Fig. 1, with parts shown in section but shows a modified form of engine and pump.

As stated above this invention is of general application, but for purposes of description it is shown in connection with a suction gas producer constructed to operate upon solid carbonaceous fuel. As is well known producer gas results, when such fuels are used, from blasting a bed of ignited carbonaceous material, such as coal, with air and, preferably, moisture the gas making reactions, in this as in all other types of producers, involving incomplete combustion of the fuel. Producers may be either pressure operated, in which the blast is forced through the fuel bed under pressure, or suction operated, in which case the generating chamber containing the fuel is maintained under a partial vacuum, the blast thus being drawn through the fuel under suction. In either case the fuel bed, during gas making reactions, is maintained in a state of incandescence, the blast being so proportioned and controlled that the proper gas making reactions occur during the combustion of the fuel.

While any type of producer may be utilized, the form illustrated in the drawing has been found particularly satisfactory for small size producers, for example, those having a grate diameter of not more than twelve inches. The producer shown, which is designated generally by the numeral 19, comprises a metallic shell 20 having a lining therein so constructed as to be both heat insulating and heat resisting. This lining preferably consists of a thin layer of heat resisting material 21, backed by a layer of heat insulating material 22, the heat insulating material filling the space between the layer 21 and the metallic shell 20. The heat resisting material 21 may be of any suitable character, fire brick having been found to function very satisfactorily. If desired, however, a tube of heat resisting metal, composed for example of some one of the well-known chromium-nickel alloys, may be used. The heat insulating material may also vary in character, a very satisfactory material being a mixture of silocel, which consists primarily of kieselguhr, and cement in the portions of four parts of silocel to one of cement. Inasmuch as the principal function of this heat insulating material is to prevent the loss of heat from the generating chamber, by radiation into the atmosphere from the metallic shell 20, this material may be of any desired character so long as it tends to minimize these heat losses. For example, asbestos would function quite satisfactorily. Or the heat resisting and heat insulating characteristics may be combined in a lining consisting of a single material, as is the case when the lining consists of a material such as charcoal, either compacted or loose.

The lower part of the gas generating chamber is closed by means of a grate 23, which is out of thermal connection with the metallic shell of the producer, to prevent heat losses from the fuel bed through the grate into the metallic shell and thence by radiation into the atmosphere. This grate is supported by a plurality of legs 24 which further tend to cut down the heat losses from the grate, due to the small conducting capacity of the legs and to the poor thermal contact between the legs of the grate and the base of the producer upon which they are supported. The grate, when in position is mounted within an ash pit 25, in the lower part of the producer, which is normally closed by means of a door 26, through which the grate may be inserted into position within the ash pit or removed therefrom, and through which ashes may be removed. The air and moisture, which constitute the blast for the generation of the gas, pass in through the pipe 27, this pipe being connected to any suitable apparatus for controlling the proportions of air and moisture. Inasmuch as many of the conventional types of moisture regulation which are well known commercially will function satisfactorily for this purpose this particular part of the apparatus is not shown. A satisfactory form of moisture control is shown in the patent of Harry F. Smith, No. 888,359 dated Mar. 19, 1908.

The top of the producer has an opening 30 therein surrounded by an upstanding flange 31 through which fuel is introduced into the generating chamber of the producer. Any suitable type of fuel feeding mechanism may be associated with the producer for supplying fuel thereto. One such type consists of a magazine or reservoir 35, which is preferably made of thin sheet metal and is substantially the same in construction as the conventional milk can. This magazine has a constricted outlet or neck 36 adapted to be positioned within the flange 31, a spaced flange 37 being provided so that when the magazine is in position the upper end of the flange 31 will be within the space between the flange 37 and outlet end 36 of the magazine, suitable packing 38 being provided so that a tight joint is thus insured and the leakage of air into the producer, or gas out from the producer, through the opening 30 prevented. If desired spring clips 40 may be provided for holding the reservoir tightly against the flange 31 although the weight of the reservoir will normally be sufficient to maintain a tight joint without the use of these clips.

Leading off from the upper part of the generating chamber is the outlet pipe or gas offtake 45, one end of which is connected to the inlet of the cylinder 50 of a pump. As shown the producer is suction operated the pump serving to withdraw the generated gas from the producer and force it under pressure through the delivery main 46 to any desired place of use or storage. The producer might just as well operate under pressure in which case the pump would be utilized to force the blast through the producer to generate the gas rather than to draw the blast into the producer and the generated gas out of the producer, under suction.

Any desired type of pump may be used. For purposes of illustration a conventional, positively operated, piston or plunger pump is shown, the cylinder 50 having a piston 51 which reciprocates therein, an inlet valve 52 being associated with the offtake pipe 45, and an outlet valve 53 with the delivery main 46. As this pump operates gas is withdrawn from the producer under suction and forced through the delivery main 46 under suitable pressure. Operatively connected to the piston 51 is a piston rod 54 to which is attached one end of the connecting rod 55 the other end being attached to one crank pin 57 of the crankshaft 56.

Connected to another crank pin 58 of the crankshaft is a connecting rod 59, which is in turn attached to the piston 61 of a hot air engine. This piston is mounted within a cylinder 65, provided around the outer end with a water jacket 66 the heat rejected by the engine during operation passing into the water within the water jacket, to heat that water and at the same time to withdraw heat from the gases within the cylinder. The inner end of this cylinder is, as shown most clearly in Fig. 1, imbedded within the lining of the producer. This inner end of the cylinder is composed of a metal which is highly resistant to heat, a metal, for example, such as several of the well known chromium-nickel alloys. This inner part 67 of the cylinder, is preferably so positioned within the lining of the producer that it is exposed to the interior of the generating chamber, where it is freely subjected to the heat generated during the gas making reactions. The cylinder of the engine need not necessarily be so positioned that it is indirectly exposed to the interior of the generating chamber, but it should be so positioned that it receives heat from within said chamber, either directly or indirectly, that is, so that there is a heat energy input into the cylinder. Also positioned within the cylinder is a displacement member 70. This preferably consists of a hollow metallic member mounted upon a rod 71 which passes through a suitable opening in the piston 61, and has its other end, outside the cylinder 65, pivotally attached to the connecting rod 72, which is in turn connected to a third crankpin 73 of the crankshaft 56. The pin 73 is at substantially ninety degrees from the pin 58.

In the operation of the device, the hot air engine, under the influence of the heat generated within the generating chamber, operates the piston 51 of the pump to cause the transfer of gas therethrough. Presuming that the hot air engine is in the postion shown in Fig. 1, the piston 61 is at substantially outer dead center. The arrangement of the crankshaft is such that the displacement member is ninety degrees ahead of the piston during operation. Therefore the displacement member at this time is moving toward its inner dead center. As it moves inward it displaces the air in the inner end of the cylinder, which air is at this time highly heated and in an expanded condition because of its having been in intimate contact with the highly heated inner end 67 of the cylinder, and transfers it into the outer end of the cylinder, within the water cooled zone, where it is cooled down and therefore contracts. Consequently the unbalanced atmospheric pressure forces the piston 61 inwardly upon a working stroke, imparting rotary motion to the shaft 56 and thus causing the piston 51 of the pump to reciprocate. As the crankshaft continues to rotate assisted by the inertia of the fly wheel 75, which is mounted on the crankshaft 56, the displacement member 70 is moved outwardly, to displace the cooled air from the water jacketed zone of the cylinder and cause it to pass into the inner end of the cylinder where it is again heated. At this time the piston 61 has reached substantially inner dead center and as the air is heated and expands the piston is forced outwardly on a working stroke.

This type of engine, functions very satisfactorily and is extremely economical inasmuch as it utilizes sensible heat which would be subsequently lost by the gas as it is transferred through the delivery main 46, and associated apparatus not shown but forming a conventional part of substantially all gas producer systems, to a place of use.

The water jacket 66 is preferably connected to a hot water storage tank 80 by means of the pipe 81 which opens into the upper end of the hot water tank, and the pipe 82 which opens into the lower end of the hot water supply tank. As the water within the jacket 66 receives heat rejected by the engine during operation thereof a circulation is set up so that the water within the storage tank 80 is heated. A pipe 83, for withdrawing this heated water for use, is provided and also a pipe 84 through which fresh water is introduced into the tank as needed.

Figs. 3 and 4 show more in detail certain elements of construction of the piston 61. As shown in these figures the connecting rod 59 is pivoted about the wrist pin 63, which is held in place within the piston by any suitable means, as for example by means of set screws 64. Packing 76, shown conventionally since it may be of any suitable character, is provided within the piston head for preventing leakage along the rod 71.

In the form of apparatus described above the hot air engine is imbedded directly in the lining of the generator, being so positioned that the heat energy which operates it is imparted thereto from the heated fuel and gases within the generating chamber. Therefore during such time as the gas making reactions are taking place, and during such further time as the fuel bed remains ignited or incandescent, ample heat energy will be available for operating this engine. And, in the type of producer illustrated the fuel bed will normally remain ignited or incandescent for a number of hours, often as much as 48 hours, after the generation of gas has ceased. But the hot air engine need not necessarily receive heat energy direct from the generating chamber. If desired this same type of engine may have a burner associated therewith at which some of the gas produced, or other suitable fuel, may be burned for effective operation of the device. Or the construction may be such that the heated gas as it leaves the generator will be brought into contact with the end of the engine cylinder, the temperature of the gas at this stage ranging upwardly to 1200°–1400° F.

In the embodiment of the invention shown in Fig. 5 an improved type of hot air engine is shown, which, is more particularly illustrated and is claimed in the patent of Harry F. Smith, No. 1,675,829, dated July 3, 1928. This engine operates upon the heat generated by the burning of some suitable fuel such as producer gas, city gas, natural gas, or oil. This type of engine of course would function satisfactorily if arranged with the cylinder imbedded in the lining of the generator in the same manner as shown in Fig. 1 and described above.

This particular engine is so constructed that the engine and pump are built in a single unit which is capable of general application. The engine comprises a water jacketed cylinder 100, cooling water being supplied to the cylinder jacket through the pipe 81' and led off from the cylinder jacket through the pipe 82'. These two pipes are preferably connected to a hot water storage tank 80' similar to the tank 80 of Fig. 1. Connected to one end of the cylinder 100 is a member 103, consisting of some material which is a good conductor of heat and is at the same time highly resistant to heat. Preferably this member is composed of some one of the well known nickel-chromium heat-resisting alloys.

Mounted upon the other end of the cylinder 100 is a plate 105, having a central opening or hole 106 therein, within which is positioned the piston 107. This piston has, on the end which extends into the cylinder 100, an extension 108. The other end of the piston is hollow, or cup shaped, and is surrounded by a cylindrical sylphon bellows 110, one end of which is attached to the plate 105, around the hole 106, the other end being attached to the free end of the piston. This sylphon is so attached to the piston and to the plate 105 that a gas-tight joint is secured at each place of attachment. Since the sylphon readily expands and collapses, reciprocation of the piston within the cylinder is permitted, while at the same time leakage along the piston is prevented without the use of ordinary packing which, in order to insure a gas-tight fit, produces excessive friction thus decreasing mechanical efficiency. Obviously in an engine of the type, described, the cylinder containing the expansible fluid must be tight, under the pressure attained, otherwise the efficiency of the device will be materially affected. With the type of construction here described leakage is prevented while at the same time friction losses are minimized, and substantially prevented.

The crank pin of a suitable crank shaft passes through an opening 140 within the extension 108 of the piston 107, a suitable ball-bearing 141 being provided to minimize the friction at this point during operation. The crank passes through a suitable opening 142 in the cross bar of the refrigerator member 144. Each of these constructions constitutes in effect what is known as a "Scotch yoke." This refrigerator member is cylindrical in form and so proportioned that it fits snugly within the cylinder 100. It is composed of a material which is a good conductor of heat as compared with iron or steel, preferably aluminum or copper, and is provided with a plurality of passages, which serve to permit the ready passage of the gas within the cylinder therethrough and at the same time expose to this gas a greater surface. This refrigerator fits in heat transferring relation with the cylinder wall. Because of its attachment to the crank pin the refrigerator reciprocates within the cylinder, during operation of the engine, the reciprocation bearing a definite time relation to the reciprocation of the piston. The openings 140 and 142 are so constructed that the outer ball races, of the ball-bearings cooperating with the crank pins, move along the walls of the respective openings as the crank shaft rotates thus changing the reciprocating motion of the piston into rotating motion of the crankshaft and the rotating motion of the crankshaft into reciprocating motion of the refrigerator. The refrigerator is cut away, to receive the inner end of the crank shaft and the various parts cooperating therewith.

Attached to the lower end of the refrigerator, by means of the bolt 150 is a hollow cage 151, having its opposite ends perforated, to permit the ready passage therethrough of the gas within the cylinder. This cage, or regenerator, contains some material, such as finely spun glass wool, designated generally by the numeral 152, which is of such character as to increase its regenerative capacity, one end of the cage being removable to permit access to the interior thereof. The material within the regenerator is preferably a poor conductor of heat. The regenerator 152, with the refrigerator, also constitutes the displacement member of the engine, corresponding to the member 70 of the engine shown in Figs. 1 and 2. As the displacement member moves toward or from the heated end 103 of the cylinder the gas within that cylinder is caused to move toward the cool end of the cylinder or back toward the hot end. As the displacement member moves toward the hot end the hot gas is forced to pass through the regenerator 151 where it gives up a considerable part of its sensible heat to the spun glass, or similar material, within the regenerator. The gas is then passed through the refrigerator 144 which absorbs some of the sensible heat and rejects that heat through the cylinder wall into the cooling water within the water jacket. The gas is thus cooled and caused to contract, and the piston 107 therefore moves inwardly, under the action of the atmospheric pressure. The displacement member being 90° in advance of the piston has begun its outward movement as the piston begins to move inward. As this displacement member moves outwardly the cooled gas in the outer end of the cylinder is forced through the regenerator where it takes up some of the heat imparted to that regenerator on the previous stroke, and then passes into the heated end of the cylinder where its temperature is still further raised. This causes expansion of the gas and the piston is therefore forced outwardly. Rotation is thus imparted to the crankshaft, a suitable fly wheel serving to maintain that motion uniform.

Mounted upon the upper end of the cylinder 100, and surrounding the hollow end of the piston 107 and the sylphon bellows 110 is a hollow cap 155, which constitutes the cylinder of the compressor or pump. This cap is attached to the engine cylinder by suitable bolts, not shown, or by other conventional means, the construction being such that this pump cylinder also holds the plate 105 in position and forms a continuation of the cylinder 100. The cylinder 155 has an inlet opening 156 to which is connected the offtake pipe 45' of the generator 19'. Positioned within the inlet opening 156 is an inlet valve comprising a seat member 157 with which cooperates a valve disc 158, normally held to its seat by means of a spring 159 mounted upon the bolt 160 which is threaded within the seat member 157. The cylinder 155 also has an outlet opening 161 therein, to which is connected the delivery main 46', which leads to any desired place of storage or use of the gas.

Mounted within the outlet opening 161 is an outlet valve similar in construction to the inlet valve described just above. The opening in the hollow end of the piston 107 is closed by means of the plate 165. The piston 107 serves both as the power piston of the air engine and as the piston for the pump or compressor.

The combined engine and compressor is supported upon a base member 170, which may be of any suitable construction, the upper end of this base member inclosing the end 103 of the cylinder, and having a suitable lining 171, of fire brick, or analogous material, which incloses the combustion chamber 172. A burner 173, at which any suitable fuel may be burned to generate the heat necessary for the operation of the engine, opens into the combustion chamber 172, the hot products of combustion passing off through the outlets 174. Any of the generally available gaseous or liquid fuels may be used for the operation of this engine, but preferably it is operated by the gas generated by the producer itself. As shown in the drawing, the burner 173 is connected to the delivery main 46' by means of the pipe 175. This pipe leads into the delivery main 46' at such a place that it can receive gas either from a place of storage to which the delivery main is connected, or from the producer itself, that is the burner floats on the delivery main, a suitable valve 176 being provided for cutting off, or controlling, the flow of fuel to the burner.

Other types of engine than those shown may be used in connection with the system described, which comprises a hot water supply system and a power unit of such thermodynamic characteristics that the part of the heat energy input which is rejected by the engine is utilized for heating the water in the hot water supply system. The engines described are heat engines closed cycles, but other types of heat engines, such as these, in which part of the heat energy input is rejected may be used. And although the engine and the hot water supply system are preferably to be associated with a domestic gas generating outfit, in which the sensible heat generated during the gas making reactions is utilized for operating the engine and heating the water, this is not essential.

While the method herein described, and the forms of apparatus for carrying this method into effect, constitute preferred embodiments of the invention, it is to be understood that the invention is not limited to this precise method and forms of apparatus, and that changes may be made in either without departing from the scope of the invention which is defined in the appended claims.

What is claimed is:

1. A domestic gas generating system for supplying a combustible gas for domestic use, comprising in combination a gas producer, of the character described for generating combustible gas; a hot air engine adapted to receive heat energy from the generated gas, said engine having a water jacketed cylinder; and a hot water supply system associated with said cylinder and connected to said cylinder jacket, whereby during operation of the engine, a circulation of water takes place through the cylinder jacket and the hot water supply system, to cool the cylinder of the hot air engine and at the same time heat up the water within the hot water supply system, a part of the heat energy input from the gas into the engine being transformed within the engine into power, and that part of the heat energy input not so transformed being rejected into the water within the hot water supply system.

2. A domestic gas generating system comprising, in combination, a gas producer adapted to contain a fuel bed of ignited carbonaceous material; pumping means for causing air and moisture to pass through said fuel bed, to cause the generation of combustible gas, and to deliver said generated gas to a work device, or place of storage; and heat responsive means cooperating with said pumping means and adapted to be operated by the heat energy generated within the gas producer for causing operation of said pumping means.

3. A domestic gas generating system for supplying a combustible gas for domestic use comprising, in combination, a gas generating chamber, adapted to contain a fuel bed of ignited carbonaceous material; means for blasting the fuel bed to cause the generation of combustible gas, and to deliver said generated gas to a work device, or place of storage; and a hot air engine, adapted to be operated by the heat energy generated within the generating chamber, for operating said blasting means.

4. A domestic gas generating system for supplying a combustible gas for domestic use comprising, in combination, a gas generating chamber, adapted to contain a fuel bed of ignited carbonaceous material; a pump for causing air and steam to pass through the generating chamber and the fuel bed therein to cause the generation of combustible gas, and to deliver said generated gas to a work device, or place of storage; and a closed cycle hot air engine operatively connected to said pump, said engine having its cylinder so placed as to receive sensible heat from the generating chamber.

5. A domestic gas generating system for supplying a combustible gas for domestic use comprising, in combination, a gas generating chamber, adapted to contain a fuel bed of ignited carbonaceous material; a pump for causing air and moisture to pass through said fuel bed within said chamber and for causing delivery of the generated combustible gas to a work device, or place of storage; a hot air engine operatively connected to said pump, and means for burning a fraction of the generated gas in heat transfer relationship with said hot air engine to cause operation of said hot air engine.

6. A domestic gas generating system for supplying a combustible gas for domestic use comprising, in combination, a gas generating chamber, adapted to contain a fuel bed of ignited carbonaceous material; a pump for causing air and moisture to pass through said fuel bed and for causing delivery of the generated combustible gas to a work device, or place of storage; a heat engine operatively connected to said pump, adapted to be operated by a fraction of the heat energy generated within said chamber; means for cooling the heat engine, and a hot water tank forming part of a domestic hot water supply system associated with said cooling means, whereby the water in said tank is heated as the heat engine is cooled.

7. A domestic gas generating system of the character described for supplying a combustible gas for domestic use comprising, in combination, a combustible gas generating chamber; a domestic hot water supply system; and a heat engine, adapted to be operated by a fraction of the heat energy of the gas generated operatively associated with the gas generating chamber and with the hot water supply system, such that part of the heat energy input from the gas into the engine is transformed within the engine into power, and that part of the heat energy input not so transformed is rejected into the water within the hot water supply system.

8. A domestic gas generating system of the character described for supplying a combustible gas for domestic use comprising, in combination, a hot water supply system; a gas generating chamber, adapted to contain carbonaceous fuel, means for causing air and moisture to pass through said chamber to cause generation of a combustible gas through gas making reactions involving incomplete combustion of the fuel, and for delivering said generated gas to a work device, or place of storage; a heat engine associated with the hot water supply system, for operating said air and moisture introducing means; means for effecting a heat energy input from the generated gas into the engine, and other means for subjecting the water in the hot water supply system to the heating effect of that part of the heat energy input into the engine which is rejected by said engine.

9. A domestic gas generating system for supplying a combustible gas for domestic use comprising, in combination, a producer for generating the combustible gas and adapted to contain a fuel bed, means for causing air and moisture to pass through said fuel bed within said producer and for delivering the generated gas to a work device, or place of storage; and a hot air engine adapted to be operated by heat energy of a small fraction of the generated gas to drive the said supplying means and do other useful work.

In testimony whereof I hereto affix my signature.

HARRY F. SMITH.

CERTIFICATE OF CORRECTION.

Patent No. 1,785,820.            Granted December 23, 1930, to

HARRY F. SMITH.

It is hereby certified that error appears in the printed specification of the above numbered patent requiring correction as follows: Page 1, line 13, after the word "several" insert the word hundred; page 6, line 30, claim 2, after the word "by" strike out the article the; and that the said Letters Patent should be read with these corrections therein that the same may conform to the record of the case in the Patent Office.

Signed and sealed this 3rd day of February, A. D. 1931.

(Seal)

M. J. Moore,
Acting Commissioner of Patents.